(12) United States Patent
Lee et al.

(10) Patent No.: US 10,061,157 B2
(45) Date of Patent: Aug. 28, 2018

(54) BACKLIGHT UNIT AND DISPLAY APPARATUS INCLUDING THE SAME

(71) Applicant: Samsung Display Co., Ltd., Yongin-si, Gyeonggi-do (KR)

(72) Inventors: Sanggil Lee, Yongin-si (KR); Myeonghee Kim, Yongin-si (KR)

(73) Assignee: Samsung Display Co., Ltd., Gyeonggi-do (KR)

(*) Notice: Subject to any disclaimer, the term of this patent is extended or adjusted under 35 U.S.C. 154(b) by 257 days.

(21) Appl. No.: 15/044,680

(22) Filed: Feb. 16, 2016

(65) Prior Publication Data

US 2017/0038039 A1    Feb. 9, 2017

(30) Foreign Application Priority Data

Aug. 6, 2015  (KR) .................. 10-2015-0111206

(51) Int. Cl.
*G02F 1/1335*    (2006.01)

(52) U.S. Cl.
CPC .. *G02F 1/133603* (2013.01); *G02F 1/133608* (2013.01); *G02F 2001/133612* (2013.01)

(58) Field of Classification Search
CPC .............. G02F 1/133603; G02F 1/133608
See application file for complete search history.

(56) References Cited

U.S. PATENT DOCUMENTS

| 2011/0102707 | A1  | 5/2011 | Yoo |
| 2013/0221383 | A1* | 8/2013 | Lee ............... H01L 33/486 |
|              |     |        | 257/88 |

FOREIGN PATENT DOCUMENTS

| KR | 10-2007-0108638 A | 11/2007 |
| KR | 10-2008-0014405 A | 2/2008 |
| KR | 10-2008-0037261 A | 4/2008 |
| KR | 10-2008-0073027 A | 8/2008 |
| KR | 10-2010-0131662 A | 12/2010 |
| KR | 10-2011-0048283 A | 5/2011 |
| KR | 10-2011-0123585 A | 11/2011 |
| KR | 10-2012-0008677 A | 2/2012 |
| KR | 10-2012-0067610 A | 6/2012 |
| KR | 10-2012-0134172 A | 12/2012 |
| KR | 10-2013-0097948 A | 9/2013 |
| KR | 10-2013-0142297 A | 12/2013 |

* cited by examiner

*Primary Examiner* — Anne Hines
(74) *Attorney, Agent, or Firm* — Knobbe Martens Olson & Bear LLP

(57) ABSTRACT

A backlight unit includes a frame and a light source disposed on the frame. The light source includes a base layer having glass fiber, a wiring layer disposed on the base layer, and at least one light-emitting diode electrically connected to the wiring layer.

19 Claims, 8 Drawing Sheets

BACKLIGHT UNIT AND DISPLAY APPARATUS INCLUDING THE SAME

CROSS-REFERENCE TO RELATED APPLICATION

This application claims the benefit of Korean Patent Application No. 10-2015-0111206, filed on Aug. 6, 2015, in the Korean Intellectual Property Office, the disclosure of which is incorporated herein in its entirety by reference.

BACKGROUND

1. Field

One or more embodiments relate to a backlight unit and a display apparatus including the same, and more particularly, to a backlight unit usable to realize a more efficient display apparatus, and a display apparatus including the same.

2. Description of the Related Technology

Generally, in some display panels, such as a liquid crystal display apparatus, pixels are not self-luminous. Accordingly, a backlight unit is disposed in a rear portion of a display panel of the liquid crystal display apparatus to irradiate light to the display panel.

Among structures of the liquid crystal display apparatus, the performance of the display panel has been improved. However, it is not easy to realize an efficient display in the liquid crystal display apparatus since the overall performance of the liquid crystal display apparatus may depend on the performance of the backlight unit of the liquid crystal display apparatus.

SUMMARY

One or more embodiments include a backlight unit usable to realize a more efficient display apparatus, and a display apparatus including the same.

Additional aspects will be set forth in part in the description which follows and, in part, will be apparent from the description, or may be learned by practice of the presented embodiments.

One aspect of the invention provides a backlight apparatus comprising: a frame; and a light source disposed on the frame, the light source comprising a base layer having glass fiber, a wiring layer disposed on the base layer, and at least one light-emitting diode electrically connected to the wiring layer.

In the foregoing apparatus, the frame may be substantially flexible. The frame may comprise a front surface, a rear surface facing away from the front surface, and side surfaces connecting the front surface and the rear surface, wherein the base layer covers the front surface, at least one of the side surfaces, and at least a portion of the rear surface of the frame. The side surfaces may comprise a first side surface and a second side surface which is spaced apart from and faces away from the first side surface, wherein the base layer covers the first and second side surfaces. The base layer may comprise a first boundary portion and a second boundary portion, wherein the first boundary portion covers a portion of the rear surface disposed adjacent to the first side surface, wherein the second boundary portion covers another portion of the rear surface disposed adjacent to the second side surface.

Still in the foregoing apparatus, the frame may comprise a first groove and a second groove in the rear surface, wherein a portion of the first boundary portion is disposed in the first groove, wherein a portion of the second boundary portion is disposed in the second groove. The frame may comprise a first concave portion in the rear surface, wherein the backlight apparatus further comprises a driving circuit disposed in the first concave portion to be electrically connected to one of a first portion of the wiring layer disposed on the first boundary portion of the base layer and a second portion of the wiring layer disposed on the second boundary portion of the base layer. The frame may comprise a first concave portion in the rear surface, wherein the backlight apparatus further comprises a driving circuit disposed in the first concave portion to be electrically connected to the wiring layer.

Still in the foregoing method, the side surfaces may comprise a first side surface and a second side surface which is spaced apart from and faces away from the first side surface, wherein the base layer covers the first side surface and the second side surface, wherein the backlight apparatus may further comprise a first flexible printed circuit board which electrically connects the driving circuit to a portion of the wiring layer disposed on a part of the base layer, the part of the base layer being disposed on the front surface of the frame and adjacent to a third side surface of the side surfaces, the third side surface connecting the first side surface and the second side surface.

Yet in the foregoing apparatus, the frame may comprise a plurality of second concave portions disposed in the rear surface adjacent to a third side surface of the side surfaces, the third side surface connecting a first side surface of the side surfaces to a second side surface of the side surfaces which are spaced apart from each other, wherein the backlight apparatus further comprises a plurality of printed circuit boards disposed in the second concave portions, a first flexible printed circuit board electrically connecting the driving circuit unit to at least one of the printed circuit boards, a plurality of second flexible printed circuit boards electrically connecting the plurality of printed circuit boards to each other, and a third flexible printed circuit board, and wherein the side surfaces comprise a first side surface and a second side surface which is spaced apart from and faces away from the first side surface, and the base layer covers the first side surface and the second side surface, wherein the third flexible printed circuit board electrically connects the plurality of printed circuit boards to a portion of the wiring layer disposed on a part of the base layer, the part of the base layer being disposed on the front surface of the frame and adjacent to the third side surface. The frame may comprise a plurality of holes.

Further in the foregoing apparatus, the frame may comprise a front surface, a rear surface facing away from the front surface, and a plurality of side surfaces connecting the front surface and the rear surface, wherein the at least one light-emitting diode comprises a plurality of light-emitting diodes arranged in an array, wherein the wiring layer comprises a plurality of conductor portions which are electrically conductive and separate from each other, the plurality of conductor portions comprising a first peripheral conductor portion, a second peripheral conductor portion and intermediate conductor portions disposed between the first peripheral conductor portion and the second peripheral conductor portion, wherein the first peripheral conductor portion may extend over the front surface, a first one of the side surfaces and the rear surface of the frame such that the first peripheral conductor portion has an area substantially greater than that of the intermediate conductor portions, wherein the base layer comprises an extension disposed between the first peripheral conductor portion and the front surface, the first side surface and the rear surfaces of the frame. The second peripheral conductor portion may extend over the front surface, a second one of the side surfaces and the rear surface of the frame such that the second peripheral conductor portion has an area substantially greater than that of the intermediate conductor portions, wherein the base layer comprises another extension disposed between the second peripheral conductor portion and the front surface, the first side surface and the rear surfaces of the frame.

Still further in the foregoing apparatus, each of the plurality of light emitting diode may be electrically contacts two immediately neighboring two conductor portions among the plurality of conductor portions. The apparatus may further comprise at least a driving circuit module connected to the first and second peripheral conductor portions to provide an electric signal which flows between the first peripheral conductor portion and the second peripheral conductor portion through the intermediate conductor portions and the plurality of the light-emitting diodes. The frame may comprise a recess on the rear surface and configured to receive the driving circuit module. The frame may comprise a plurality of recesses formed on the rear surface and spaced from each other, wherein the at least a driving circuit module comprises a plurality of driving circuit modules, each of which is received in one of the recesses and fixed to the frame. The apparatus may further comprise a flexible printed circuit board connecting one of the driving circuit modules and one of the intermediate conductor portions.

Another aspect of the invention provides a display apparatus comprising: one of the foregoing backlight apparatuses; and a display panel to display an image using light generated from the backlight apparatus.

According to one or more embodiments, a backlight unit may include a frame and a light source disposed on the frame, wherein the light source includes a base layer having glass fiber, a wiring layer disposed on the base layer, and a light-emitting diode electrically connected to the wiring layer.

According to one or more embodiments, the frame may be a flexible frame.

According to one or more embodiments, the frame may include a front surface, a rear surface, and side surfaces connecting the front surface and the rear surface, and the base layer covers the front surface, at least one of the side surfaces, and at least a portion of the rear surface of the frame.

According to one or more embodiments, the base layer may cover a first side surface and a second side surface, which are spaced apart from each other, among the side surfaces.

According to one or more embodiments, the base layer may include a first boundary portion, which covers a portion of the rear surface disposed adjacent to the first side surface, and a second boundary portion, which covers a portion of the rear surface disposed adjacent to the second side surface.

According to one or more embodiments, the frame may include a first groove and a second groove in the rear surface, a portion of the first boundary portion is disposed in the first groove, and a portion of the second boundary portion is disposed in the second groove.

According to one or more embodiments, the frame may include a first concave portion in the rear surface, and the backlight unit may further comprise a driving circuit unit disposed in the first concave portion to be electrically connected to one of a first portion of the wiring portion at the first boundary portion of the base layer and a second portion of the wiring portion at the second boundary portion of the base layer.

According to one or more embodiments, the frame may include a first concave portion in the rear surface, and the backlight unit may further comprise a driving circuit unit disposed in the first concave portion to be electrically connected to the wiring layer.

According to one or more embodiments, the base layer may cover a first side surface and a second side surface, which are spaced apart from each other, among the side surfaces, and the backlight unit may further include a first flexible printed circuit board which electrically connects the driving circuit unit to a portion of the wiring layer disposed on a part of the base layer. Here, the part of the base layer may be disposed on the front surface of the frame and adjacent to a third side surface of the side surface. The third side surface connects the first side surface and the second side surface.

According to one or more embodiments, the frame may include a plurality of second concave portions disposed on the rear surface adjacent to a third side surface of the side surfaces, which connects a first side surface of the side surfaces to a second side surface of the side surfaces. Here, the first side surface and the second side surface are spaced apart from each other. The backlight unit may further comprise a plurality of printed circuit boards disposed in the second concave portions, a first flexible printed circuit board electrically connecting the driving circuit unit to at least one of the printed circuit boards, a plurality of second flexible printed circuit boards electrically connecting the plurality of printed circuit boards to each other, and a third flexible printed circuit board. The base layer may cover the first side surface and the second side surface. The third flexible printed circuit board may electrically connect the plurality of printed circuit boards to a portion of the wiring layer disposed on a part of the base layer. The part of the base layer may be disposed on the front surface of the frame and adjacent to the third side surface.

According to one or more embodiments, the frame may include a plurality of holes.

According to one or more embodiments, a display apparatus may include the backlight unit, described above or hereinafter, and a display unit to display an image using light generated from the backlight unit.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
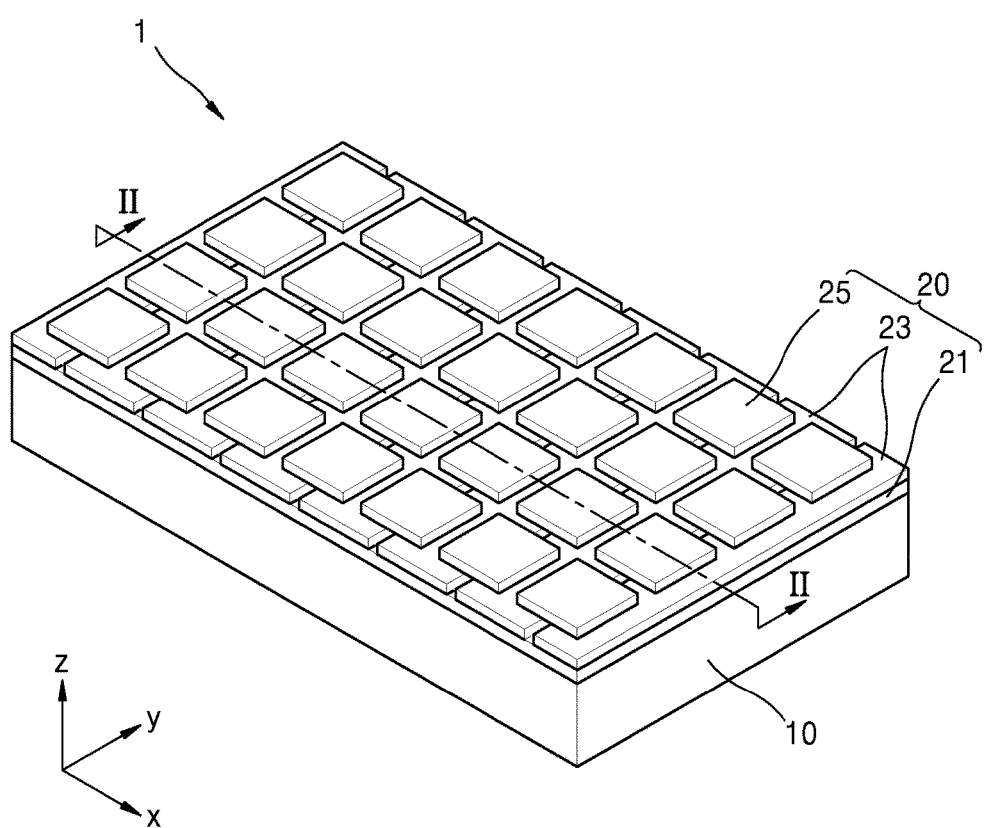
FIG. 1 is a perspective view schematically illustrating a backlight unit according to an embodiment of the present inventive concept.

The present embodiments may have different forms and embodiments and should not be construed as being limited to the descriptions set forth herein. Accordingly, the embodiments are merely described below, by referring to the figures, to explain aspects of the present description.

Reference will now be made in detail to embodiments, examples of which are illustrated in the accompanying drawings, wherein like reference numerals refer to like elements throughout.

It will be understood that although the terms "first", "second", etc. may be used herein to describe various components, these components should not be limited by these terms. These components are only used to distinguish one component from another. It will be further understood that the terms "comprises" and/or "comprising" used herein specify the presence of stated features or components, but do not preclude the presence or addition of one or more other features or components.

It will be understood that when a layer, region, or component is referred to as being formed or disposed "on," another layer, region, or component, it can be formed or disposed directly on the other layer, region, or component to contact the other layer, region, or component, or it can be formed or disposed indirectly on the other layer, region, or component with one or more intervening layers, regions, or components therebetween. Sizes of elements in the drawings may be exaggerated for convenience of explanation. Since sizes and thicknesses of components in the drawings are arbitrarily illustrated for convenience of explanation, the following embodiments are not limited thereto.

In the following examples, the x-axis, the y-axis and the z-axis are not limited to three axes of the rectangular coordinate system, and may be interpreted in a broader sense. For example, the x-axis, the y-axis, and the z-axis may be perpendicular to one another, or may represent different directions that are not perpendicular to one another.

Figure 2:
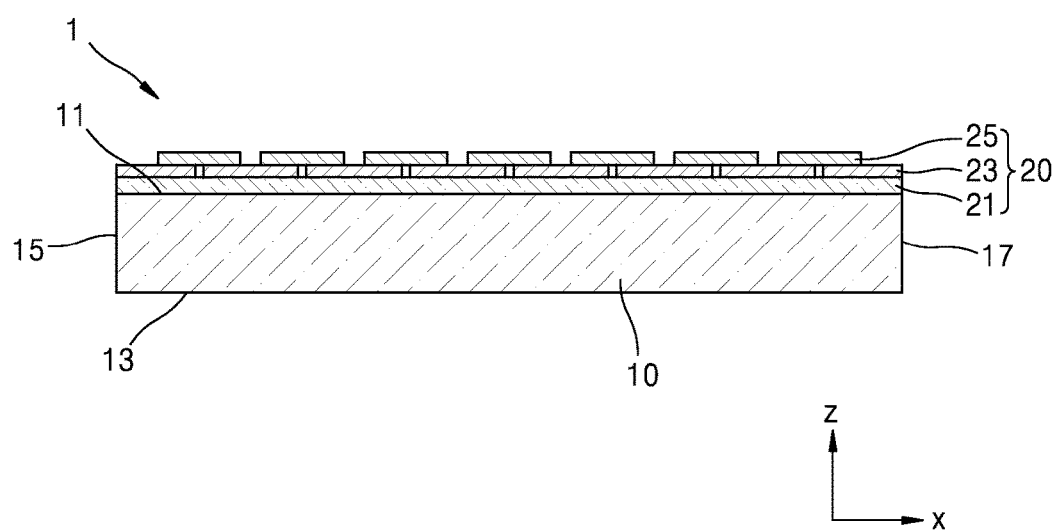
FIG. 2 is a cross-sectional view taken along a line II-II of FIG. 1.

FIG. 1 is a perspective view schematically illustrating a backlight unit 1 according to an embodiment of the present inventive concept, and FIG. 2 is a cross-sectional view taken along a line II-II of FIG. 1. The backlight unit 1 according to the present embodiment includes a frame 10 and a light source 20.

The frame 10 may include various materials. Particularly, the frame 10 and the light source 20 of the backlight unit 1 may be flexible to realize a flexible display apparatus. The frame 10 may include synthetic rubber, such as acrylonitrile butadiene rubber, or a thermoplastic resin to be flexible and to have characteristics, such as a light weight and an excellent heat resistance.

The light source 20 may be disposed on the frame 10. In detail, the light source 20 may be disposed on a front surface 11 of the frame 10 in a +z direction. The light source 20 may include a base layer 21, a wiring layer 23 disposed on the base layer 21, and light-emitting diodes 25 disposed to be electrically connected to the wiring layer 23. Here, the base layer 21 may include glass fiber of an electrical-insulation material so that the entire light source 20 has flexible characteristics. Here, the base layer 21 may include a resin, such as epoxy, in addition to the fiber glass. The wiring layer 23 may include a material having excellent electrical conductivity, ductility, and malleability.

According to the present embodiment, since the frame 10 and the light source 20 of the backlight unit 1 have flexible characteristics, the backlight unit 1 may be usable with a flexible display panel to realize a flexible display apparatus. Particularly, the base layer 21 including the fiber glass may be very flexible to improve the flexible characteristics of the backlight unit 1.

Meanwhile, the wiring layer 23 may include a plurality of conductor portions, as illustrated in FIG. 1. The respective conductor portions may have a shape that extends in a +y direction. The conductor portions may be separated from each other in the +x direction. Here, the light-emitting diodes 25 are disposed to pass over the conductor portions such that one end of the light-emitting diode 25 is electrically connected to one of the conductor portions, and the other end of the light-emitting diode 25 is electrically connected to another conductor portion. In the backlight unit 1, as illustrated in FIG. 1, an electrical signal may be applied to all the light-emitting diodes 25, which are electrically connected to the plurality of conductor portions, by applying the electrical signal to the conductor portion disposed at one end of the backlight unit 1 in the +x direction and also to the conductor portion disposed at the other end of the backlight unit 1 in a −x direction. Here, the light-emitting diodes 25 disposed in a row in the +x direction may be referred to as the light-emitting diodes 25 connected in series.

Figure 3:
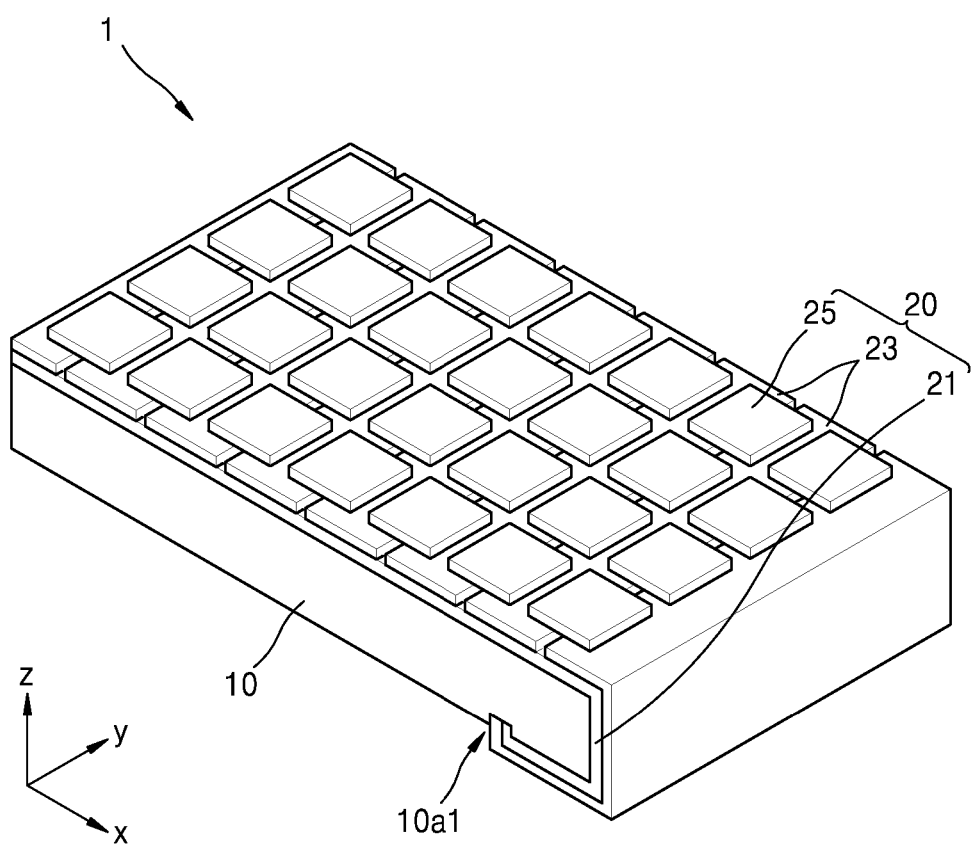
FIG. 3 is a perspective view schematically illustrating a backlight unit according to another embodiment of the present inventive concept.

FIG. 3 is a perspective view schematically illustrating a backlight unit 1 according to another embodiment of the present inventive concept. The backlight unit 1 of FIG. 3 according to the present embodiment may have a similar structure to the backlight unit 1 of FIG. 1. However, a structure of the light source 20 of FIG. 3 may be different from the structure of the light source 20 of FIG. 1.

In detail, the frame 10 includes a front surface to correspond to the light source 20, a rear surface disposed opposite to the front surface, and side surfaces connecting the front surface to the rear surface. Here, in the backlight unit 1 according to the present embodiment, the base layer 21 of the light source 20 covers the entire front surface of the frame 10 and also covers a first side surface of the side surfaces of the frame 10 and a portion of the rear surface of the frame 10.

A dead space may exist on the base layer 21 and the wiring layer 23. The dead space may be an area which does not have a function of a light-emitting area and in which the light-emitting diode 25 is not mounted because the area includes components to apply the electrical signal to the light-emitting diodes 25. If the area of the dead space of the backlight unit 1 is enlarged, an area of a dead space of a display apparatus increases even if a dead space of a display panel (for example, non-pixel area of the display panel) is reduced.

However, in the backlight unit 1 according to the present embodiment, the dead space of the backlight unit 1 may not exist on a surface of an x-y plane, which is a light-emitting surface, but may exist on the first side surface of the frame 10, which is a y-z plane, and the rear surface of the frame 10. When the backlight unit 1 is seen in a direction of a z axis, an area of the entire dead space is minimized. This means that the area of the dead space which a user recognizes may be effectively reduced in the display apparatus including the above-described backlight unit 1.

The structure of the backlight unit 1 according to the embodiments illustrated in FIG. 2 provides an enlarged side electrode that is directly connected to a power source. However, such enlarged side electrode does not increase a dead space when viewed in a direction perpendicular to a major surface of the frame.

In embodiments, if the base layer 21 of the light source 20 includes the glass fiber, the base layer 21 including the glass fiber may be flexible such that a crack does not occur in the base layer 21 or a crack occurrence is minimized and an entire structure of the light source 20 is maintained even when a boundary portion of the frame 20 is bent to a right angle, as illustrated in FIG. 3.

Meanwhile, as illustrated in FIG. 3, the frame 10 may include a first groove 10a1 formed in the rear surface of the frame 10. First boundary portions of the base layer 21 and the wiring layer 23 of the light source 20, which cover the rear surface of the frame 10, may be disposed in the first groove 10a1. A portion of the base layer 21 covering the first side surface and at least a portion of the rear surface of the frame 10 may effectively inhibit the base layer 21 from being separated or spaced apart from the first side surface and the rear surface of the frame 10. If necessary, an adhesive layer may be disposed between the frame 10 and the base layer 21 covering the first side surface and a portion of the rear surface of the frame 10.

Figure 4:
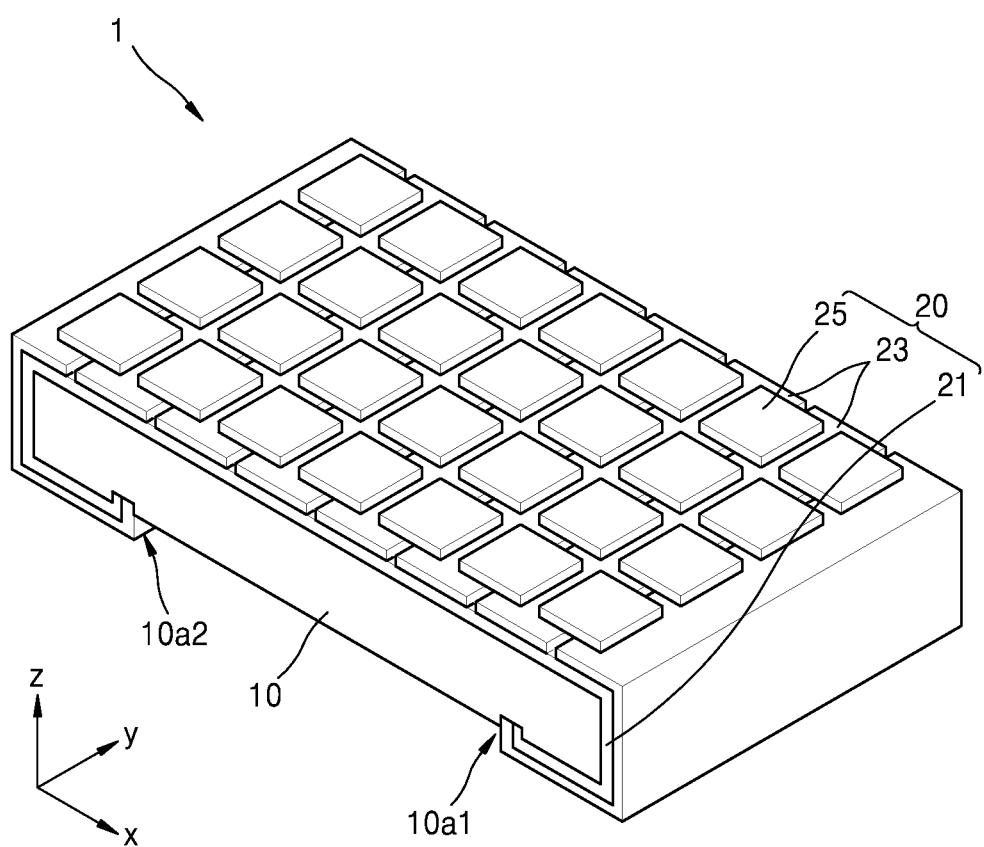
FIG. 4 is a perspective view schematically illustrating a backlight unit according to another embodiment of the present inventive concept.

FIG. 4 is a perspective view schematically illustrating a backlight unit 1 according to another embodiment of the present inventive concept. The backlight unit 1 of FIG. 4 according to the present embodiment may be different from the backlight unit 1 of FIG. 3 in that the base layer 21 of the light source 20 of FIG. 4 covers the first side surface and a second side surface of the frame 10, which are spaced apart from each other, among the side surfaces of the frame 10. The dead space that is disposed in the +x direction of the light source 20 and the dead space that is disposed in the −x direction of the light source 20 are not disposed on the front surface of the frame 10 but disposed on the side surfaces of the frame 10 to minimize an area of the dead spaces recognizable by a user when the backlight unit 1 is seen from a position on the z axis.

As illustrated in FIG. 4, the base layer 21 of the light source 20 covers the first and second side surfaces of the frame 10. In addition, the first boundary portion of the base layer 21 in the +x direction covers a portion of the rear surface disposed adjacent to the first side surface of the frame 10, and a second boundary portion of the base layer 21 in the −x direction covers another portion of the rear surface disposed adjacent to the second side surface of the frame 10. Moreover, at least a portion of the first boundary portion of the base layer 21 may be disposed in the first groove 10a1, and at least a portion of the second boundary portion of the base layer 21 may be disposed in a second groove 10a2. The base layer 21 covering the first side surface, the second side surface, and the portions of the rear surface of the frame 10 may be prevented from being separated or spaced apart from the first side surface, the second side surface, and the rear surface of the frame 10, respectively. If necessary, an adhesive layer may be disposed between the frame 10 and the base layer 21 covering the first side surface, second side surface, and the portions of the rear surface of the frame 10.

Figure 5:
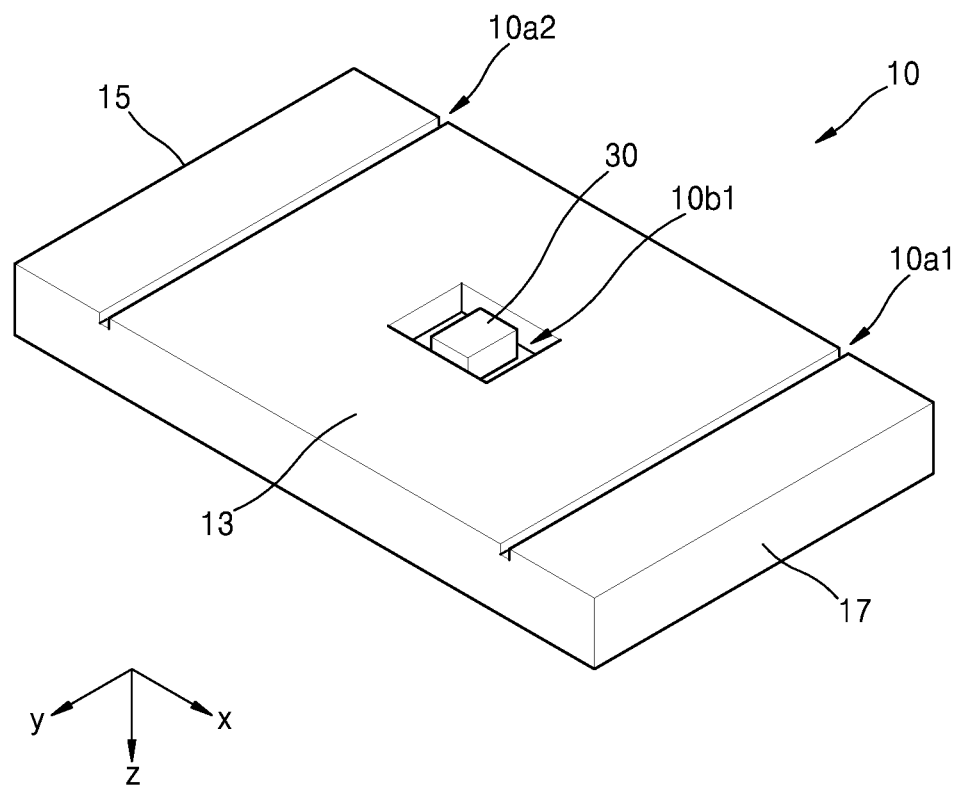
FIG. 5 is a bottom perspective view schematically illustrating a portion of a backlight unit according to another embodiment of the present inventive concept.

FIG. 5 is a bottom perspective view schematically illustrating a portion of a backlight unit 1 according to another embodiment of the present inventive concept. As illustrated in FIG. 5, the backlight unit 1 according to the present embodiment may include a first concave portion or recess 10b1 in the rear surface 13 of the frame 10. Also, the backlight unit 1 according to the present embodiment may further include a driving circuit unit 30 disposed in the first concave portion 10b1 to be electrically connected to the wiring layer 23 of the light source 20.

In order to control an operation of the backlight unit 1, it is necessary to include the driving circuit unit 30 in the backlight unit 1 to control an electrical signal to be applied to the light source 20. In the backlight unit 1 according to the present embodiment, the driving circuit unit 30 is disposed in the first concave portion 10b1 of the rear surface 13 of the frame 10 such that an entire size of the backlight unit 1 is reduced and the backlight unit 1 is effectively slimmed.

Meanwhile, as illustrated in FIG. 4, the first boundary portion of the base layer 21 of the light source 20 in the +x direction covers a portion of the rear surface 13 of the frame 10 (FIG. 5) disposed adjacent to a first side surface 17 of the frame 10 (FIG. 5). The second boundary portion of the base layer 21 spaced-apart from the first boundary portion of the base layer 21 in the −x direction covers another portion of the rear surface 13 disposed adjacent to a second side surface 15 of the frame 10 (FIG. 5). In this case, as illustrated in FIG. 5, the driving circuit unit 30 may be electrically connected to at least one of a first portion of the first boundary portion of the wiring layer 23 in the +x direction and a second portion of the second boundary portion of the wiring layer 23 in the −x direction through a flexible printed circuit board to supply the electrical signal to the light-emitting diodes 25.

Figure 6:
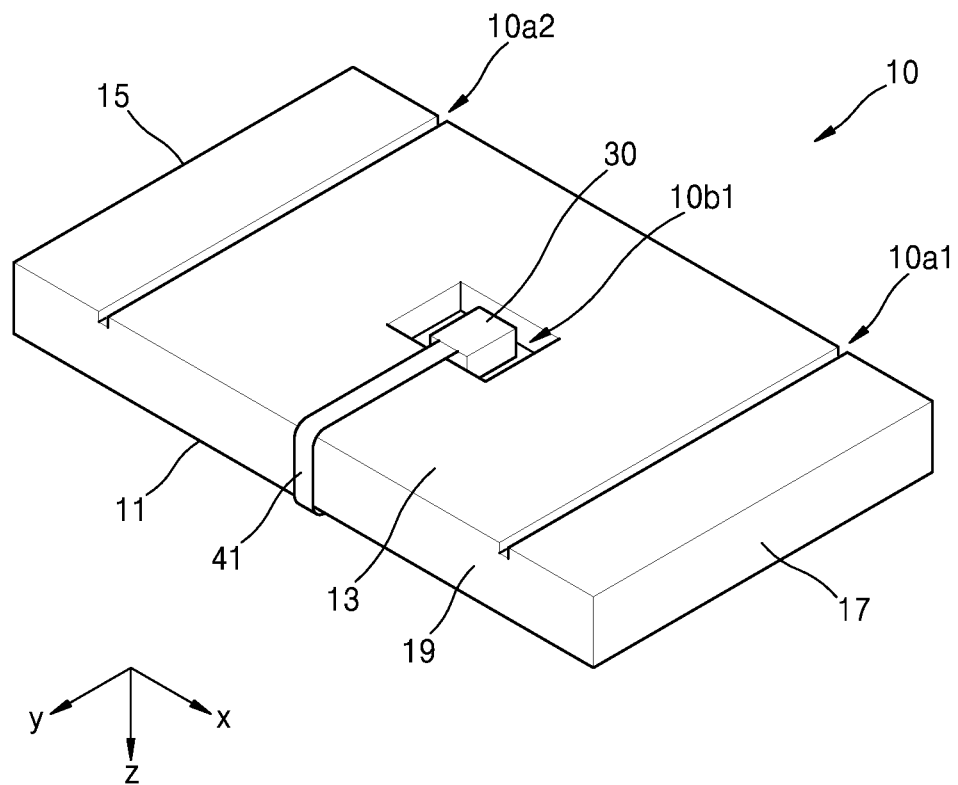
FIG. 6 is a bottom perspective view schematically illustrating a portion of a backlight unit according to another embodiment of the present inventive concept.

FIG. 6 is a bottom perspective view schematically illustrating a portion of a backlight unit 1 according to another embodiment of the present inventive concept. As illustrated in FIG. 6, although the base layer 21 of the light source 20 covers the first side surface 17 and the second side surface 15 of the frame 10, which are spaced apart from each other, among the side surfaces of the frame 10, the driving circuit unit 30 may be electrically connected to a portion of the wiring layer 23 which is disposed on a portion of the base layer 21 disposed on the front surface 11 of the frame 10 and which is disposed adjacent to a third side surface 19 of the frame 10 which connects the first side surface 17 and the second side surface 15 of the frame 10. Here, a first flexible printed circuit board 41 may electrically connect the wiring layer 23 and the driving circuit unit 30 disposed in the rear surface 13 of the frame 10, as illustrated in FIG. 6.

A driving circuit module may be more rigid than other structures including the frame, the base layer and the wiring layer. Thus, a single large driving circuit module may decrease the flexibility of the backlight around a position where the single large driving circuit module is attached. In embodiments, the backlight includes a plurality of relatively small driving circuit modules which are spaced from each other and connected to each other via printed flexible wires. Such relatively small driving circuit modules may be sized and spaced at a distance sufficient to minimize the decrease the flexibility of the backlight.

Figure 7:
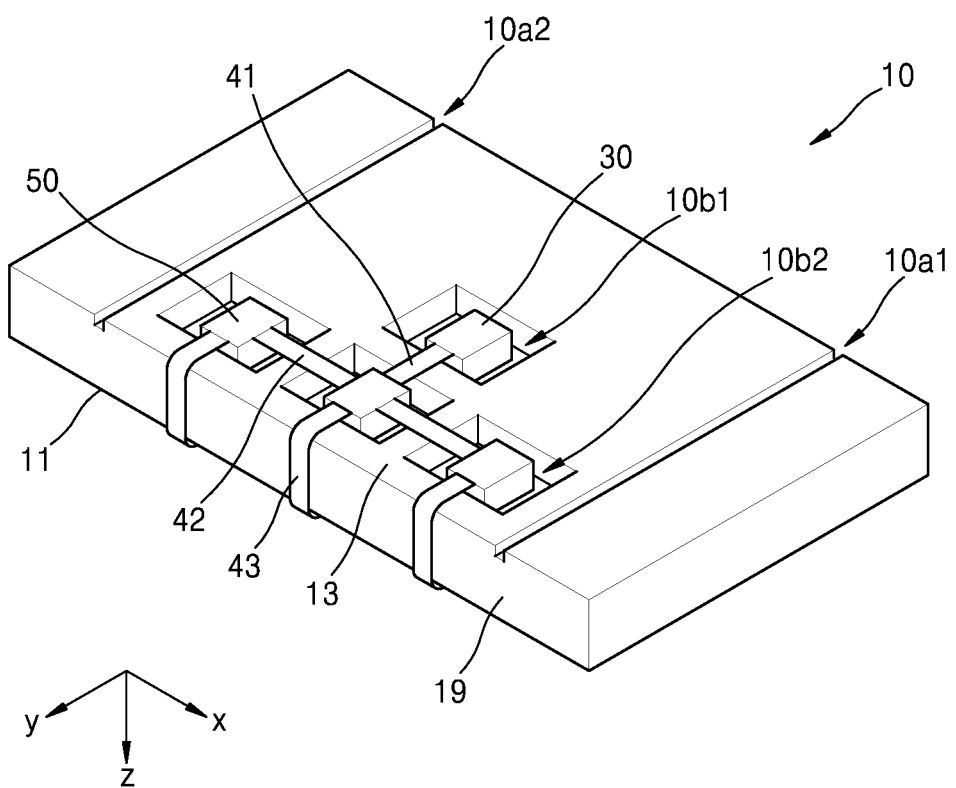
FIG. 7 is a bottom perspective view schematically illustrating a portion of a backlight unit according to another embodiment of the present inventive concept.

FIG. 7 is a bottom perspective view schematically illustrating a portion of a backlight unit 1 according to another embodiment of the present inventive concept. In the backlight unit 1 according to the present embodiment, the frame 10 may include the first concave portion 10b1 and a plurality of second concave portions 10b2. The second concave portions 10b2 may be disposed on the rear surface 13 of the frame 10 adjacent to the third side surface 19 of the frame 10. A plurality of printed circuit boards 50 are disposed in the second concave portions 10b2 so that the backlight unit 1 becomes slimmed entirely.

In this case, the first flexible printed circuit board 41 electrically connects the driving circuit unit 30 to the plurality of printed circuit boards 50. Second flexible printed circuit boards 42 may be disposed to connect the plurality of printed circuit boards 50 to each other. A plurality of third flexible printed circuit boards 43 may be disposed on the third side surface 19, which connects the first side surface 17 and the second side surface 15, to electrically connect the plurality of printed circuit boards 50 and the wiring layer 23 disposed on the base layer 21 that is disposed on the front surface 11 of the frame 10.

Particularly, the backlight unit 1 according to the present embodiment may include the plurality of small printed circuit boards 50 rather than a single large printed circuit board. When the printed circuit boards 50 do not have flexible characteristics, the plurality of small printed circuit boards 50 are spaced apart from each other in the backlight unit 1 to improve the flexible characteristics of the backlight unit 1 overall.

Figure 8:
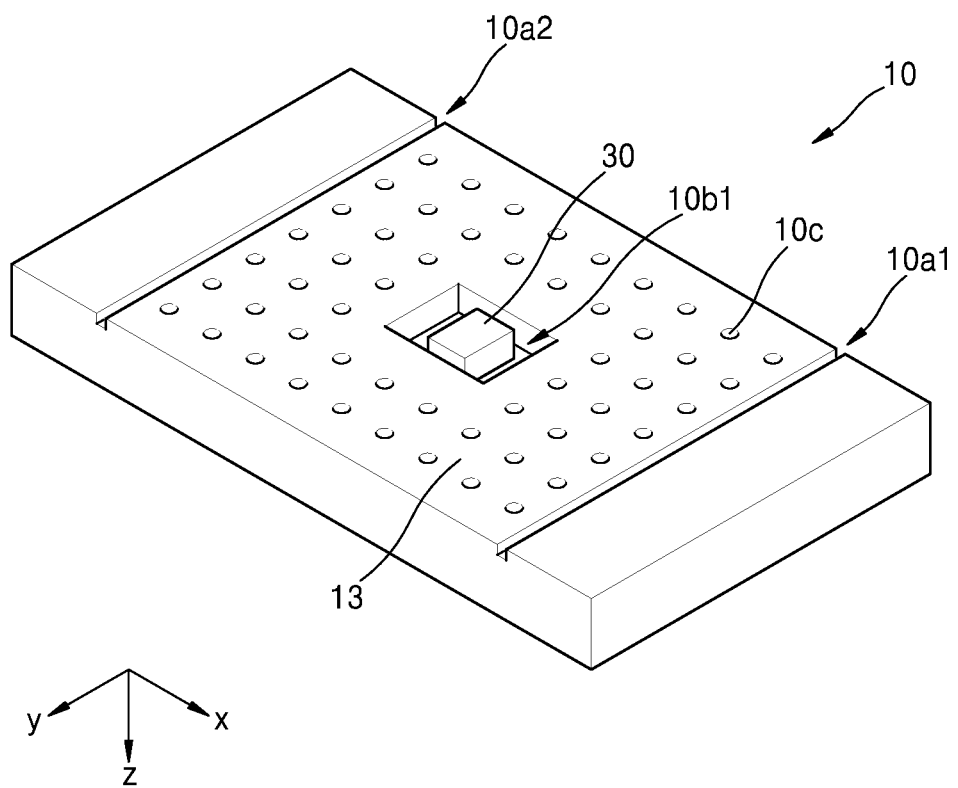
FIG. 8 is a bottom perspective view schematically illustrating a portion of a backlight unit according to another embodiment of the present inventive concept.

FIG. 8 is a bottom perspective view schematically illustrating a portion of a backlight unit 1 according to another embodiment of the present inventive concept. It may be necessary to effectively discharge heat generating when the light-emitting diodes 25 of the backlight unit 1 emit light. Accordingly, the backlight unit 1 according to the present embodiment may include a plurality of holes 10c formed in the rear surface 13 of the frame 10. The holes 10c may be through-holes. The heat generating from the light-emitting diodes 25 is transmitted to the wiring layer 23 or the base layer 21 and then is discharged to an outside of the backlight unit 1 through the frame 10 or to spaces of the holes 10c of the frame 10. This structure may be useable in the backlight unit 1 according to the embodiments described above and below.

Although the present disclosure describes the backlight unit 1 only, the present inventive concept is not limited thereto. A display apparatus including at least one backlight unit 1 described above, and a display unit to realize an image using light emitted from the backlight unit 1 is also within the scope of the present inventive concept.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A backlight apparatus comprising:
   a frame; and
   a light source disposed on the frame, the light source comprising a base layer having glass fiber, a wiring layer disposed on the base layer, and at least one light-emitting diode electrically connected to the wiring layer,
   wherein the frame comprises a front surface, a rear surface facing away from the front surface, and side surfaces connecting the front surface and the rear surface, wherein the base layer covers the front surface, at least one of the side surfaces, and at least a portion of the rear surface of the frame.

2. The backlight apparatus of claim 1, wherein the frame is substantially flexible.

3. The backlight apparatus of claim 1, wherein the side surfaces comprise a first side surface and a second side surface which is spaced apart from and faces away from the first side surface, wherein the base layer covers the first and second side surfaces.

4. The backlight apparatus of claim 3, wherein the base layer comprises a first boundary portion and a second boundary portion, wherein the first boundary portion covers a portion of the rear surface disposed adjacent to the first side surface, wherein the second boundary portion covers another portion of the rear surface disposed adjacent to the second side surface.

5. The backlight apparatus of claim 4, wherein the frame comprises a first groove and a second groove in the rear surface, wherein a portion of the first boundary portion is disposed in the first groove, wherein a portion of the second boundary portion is disposed in the second groove.

6. The backlight apparatus of claim 4, wherein the frame comprises a first concave portion in the rear surface, wherein the backlight apparatus further comprises a driving circuit disposed in the first concave portion to be electrically connected to one of a first portion of the wiring layer disposed on the first boundary portion of the base layer and a second portion of the wiring layer disposed on the second boundary portion of the base layer.

7. The backlight apparatus of claim 1, wherein the frame comprises a first concave portion in the rear surface, wherein the backlight apparatus further comprises a driving circuit disposed in the first concave portion to be electrically connected to the wiring layer.

8. The backlight apparatus of claim 7, wherein the side surfaces comprise a first side surface and a second side surface which is spaced apart from and faces away from the first side surface, wherein the base layer covers the first side surface and the second side surface, wherein the backlight apparatus further comprises a first flexible printed circuit board which electrically connects the driving circuit to a portion of the wiring layer disposed on a part of the base layer, the part of the base layer being disposed on the front surface of the frame and adjacent to a third side surface of the side surfaces, the third side surface connecting the first side surface and the second side surface.

9. The backlight apparatus of claim 7, wherein the frame comprises a plurality of second concave portions disposed in the rear surface adjacent to a third side surface of the side surfaces, the third side surface connecting a first side surface of the side surfaces to a second side surface of the side surfaces which are spaced apart from each other,
   wherein the backlight apparatus further comprises a plurality of printed circuit boards disposed in the second concave portions, a first flexible printed circuit board electrically connecting the driving circuit unit to at least one of the printed circuit boards, a plurality of second flexible printed circuit boards electrically connecting the plurality of printed circuit boards to each other, and a third flexible printed circuit board, and
   wherein the side surfaces comprise a first side surface and a second side surface which is spaced apart from and faces away from the first side surface, and the base layer covers the first side surface and the second side surface,
   wherein the third flexible printed circuit board electrically connects the plurality of printed circuit boards to a portion of the wiring layer disposed on a part of the base layer, the part of the base layer being disposed on the front surface of the frame and adjacent to the third side surface.

10. The backlight apparatus of claim 1, wherein the frame comprises a plurality of holes.

11. A display apparatus comprising:
the backlight apparatus of claim 1; and
a display panel to display an image using light generated from the backlight apparatus.

12. A backlight apparatus comprising:
a frame; and
a light source disposed on the frame, the light source comprising a base layer having glass fiber, a wiring layer disposed on the base layer, and at least one light-emitting diode electrically connected to the wiring layer,
wherein the frame comprises a front surface, a rear surface facing away from the front surface, and a plurality of side surfaces connecting the front surface and the rear surface,
wherein the at least one light-emitting diode comprises a plurality of light-emitting diodes arranged in an array,
wherein the wiring layer comprises a plurality of conductor portions which are electrically conductive and separate from each other, the plurality of conductor portions comprising a first peripheral conductor portion, a second peripheral conductor portion and intermediate conductor portions disposed between the first peripheral conductor portion and the second peripheral conductor portion,
wherein the first peripheral conductor portion extends over the front surface, a first one of the side surfaces and the rear surface of the frame such that the first peripheral conductor portion has an area substantially greater than that of the intermediate conductor portions, wherein the base layer comprises an extension disposed between the first peripheral conductor portion and the front surface, the first side surface and the rear surfaces of the frame.

13. The backlight apparatus of claim 12, wherein the second peripheral conductor portion extends over the front surface, a second one of the side surfaces and the rear surface of the frame such that the second peripheral conductor portion has an area substantially greater than that of the intermediate conductor portions, wherein the base layer comprises another extension disposed between the second peripheral conductor portion and the front surface, the first side surface and the rear surfaces of the frame.

14. The backlight apparatus of claim 12, wherein each of the plurality of light emitting diode electrically contacts two immediately neighboring two conductor portions among the plurality of conductor portions.

15. The backlight apparatus of claim 14, further comprising at least a driving circuit module connected to the first and second peripheral conductor portions to provide an electric signal which flows between the first peripheral conductor portion and the second peripheral conductor portion through the intermediate conductor portions and the plurality of the light-emitting diodes.

16. The backlight apparatus of claim 15, wherein the frame comprises a recess on the rear surface and configured to receive the driving circuit module.

17. The backlight apparatus of claim 15, wherein the frame comprises a plurality of recesses formed on the rear surface and spaced from each other, wherein the at least a driving circuit module comprises a plurality of driving circuit modules, each of which is received in one of the recesses and fixed to the frame.

18. The backlight apparatus of claim 17, further comprising a flexible printed circuit board connecting one of the driving circuit modules and one of the intermediate conductor portions.

19. A display apparatus comprising:
the backlight apparatus of claim 12; and
a display panel to display an image using light generated from the backlight apparatus.

* * * * *